Patented Aug. 31, 1937

2,091,712

UNITED STATES PATENT OFFICE 2,091,712

VULCANIZATION OF RUBBER

Percy J. Leaper, Naugatuck, Conn., assignor to United States Rubber Products, Inc., New York, N. Y., a corporation of Delaware No Drawing. Continuation of application Serial No. 18,537, April 27, 1935. This application August 22, 1936, Serial No. 97,440

16 Claims. (18—53)

This invention relates to improvements in the vulcanization of rubber and more particularly to the use of a new class of vulcanization accelerators.

This case is a continuation of case Serial No. 18,537, filed April 27, 1935.

An object of this invention is to provide a class of accelerators different from and commercially more desirable than compounds of the same general class which are already known. The new materials are readily prepared, and exhibit delayed-action characteristics which favors less scorching of the rubber on the mill.

The new accelerators are mixed anhydrides and are believed to have the constitutional formula

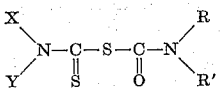

where X and Y are substituted or unsubstituted alkyl groups such as methyl, ethyl, propyl, butyl, amyl, hexyl, heptyl, octyl, benzyl, cyclo-hexyl, or may together form a heterocyclic ring with the nitrogen as exemplified by piperidyl and morpholyl. R is a substituted or unsubstituted alkyl group exemplified by ethyl, methyl, propyl, butyl, amyl, hexyl, heptyl, octyl, benzyl, cyclo-hexyl, etc. R' is a substituted or unsubstituted alkyl exemplified by ethyl, methyl, propyl, butyl, amyl, hexyl, heptyl, octyl, benzyl, cyclo-hexyl, etc., or may together with R form a heterocyclic ring with the carbamyl nitrogen atom, as exemplified by piperidyl or morpholyl.

The materials which are generally of a crystalline nature are preferably prepared by reacting an N-disubstituted carbamyl halide, preferably the chloride, with an equimolecular amount of an alkali-metal salt of the desired corresponding dithiocarbamic acid, the reaction being carried out preferably under anhydrous conditions and advantageously, in the presence of an inert liquid medium in which at least one of the reactants is at least partially soluble and in which the other reactant is dissolved or in suspension; for example, acetone, benzene, carbon disulfide, alcohol, or mixtures thereof, and under refluxing conditions or otherwise.

The following example is given to illustrate the invention and is not to be construed as limiting thereof. The parts are by weight. The stock tested was a tire tread stock of the following composition:

| | |
|---|---:|
| Smoked sheet | 100.00 |
| Carbon black | 45.00 |
| Zinc oxide | 5.00 |
| Pine tar | 3.50 |
| Zinc soaps of cocoanut oil acids | 1.25 |
| Sulphur | 3.25 |
| Acetone-diphenylamine condensate (antioxidant) | 1.00 |
| Dimethyl-carbamyl dimethyl dithiocarbamate | .39 |

Scorch test

| Cure in minutes at 5 pounds per sq. in. steam pressure | T | E |
|---|---|---|
| 45 | 136 | 930 |
| 60 | 940 | 787 |
| 75 | 3052 | 682 |
| 90 | 4797 | 745 |
| 105 | 4785 | 720 |
| 120 | 4917 | 660 |

Unaged

| Cure in minutes at 25 pounds per sq. in. steam pressure | | |
|---|---|---|
| 20 | 4560 | 760 |
| 30 | 5080 | 760 |
| 45 | 4860 | 726 |
| 60 | 4660 | 710 |
| 75 | 4280 | 700 |

Aged (72 hours in oxygen at 300 pounds pressure and 70° C.)

| | T | E |
|---|---|---|
| 20 | 3260 | 703 |
| 30 | 3500 | 693 |
| 45 | 3320 | 646 |
| 60 | 3200 | 603 |
| 75 | 3080 | 590 |

T is tensile in pounds per sq. inch at break.
E is percent elongation at break.

Examples of other materials that may be used are di-n-amyl carbamyl di-n-amyldithiocarbamate, di-n-butyl carbamyl di-n-butyldithiocarbamate, cyclopentamethylene carbamyl dimethyldithiocarbamate, and homologues thereof.

The properties of the mixed anhydrides wherein the alkyl groups attached to the nitrogen contain four or more carbon atoms in the chain, are superior to those embodying the lower molecular weight alkyl groups. These more desirable properties are, greater chemical stability and better solubility in rubber. Such superior accelerator compounds correspond to the formula

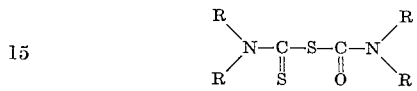

where R represents an alkyl group containing at least four carbon atoms in the chain.

The accelerators may be introduced into the rubber in any known manner, as by incorporating them on a mill in the dry form or in solution, or by diffusion from a surrounding liquid medium which may also act as the vulcanizing medium.

The accelerators may be used in other desired amounts different from that shown and with other compounding ingredients and other proportions of ingredients and in any type of rubber stock. Furthermore the accelerators of this invention may be used in conjunction with any other well known accelerators, the use of such a combination of accelerators offering the well known advantage that the scorching tendency, rate of vulcanization and properties of the vulcanized product may be varied and controlled by varying the selection and proportion of the accelerators used.

The term rubber is to be construed broadly as including caoutchouc, balata, gutta-percha, rubber isomers, synthetic rubber in either solid or liquid form, and is applicable to latex whether naturally occurring or artificially prepared.

Having thus described my invention what I claim and desire to protect by Letters Patent is:

1. A process of producing vulcanized rubber products which comprises incorporating in rubber a vulcanizing agent and an N-dialkyl-carbamyl dialkylthiocarbamyl sulfide.

2. A process of producing vulcanized rubber products which comprises incorporating in rubber a vulcanizing agent and an N-dimethyl-carbamyl dimethylthiocarbamyl sulfide.

3. A process of producing vulcanized rubber products which comprises incorporating in rubber a vulcanizing agent and cyclopentamethylene carbamyl dimethylthiocarbamyl sulfide.

4. A process of producing vulcanized rubber products which comprises incorporating in rubber a vulcanizing agent and a dialkylcarbamyl dialkylthiocarbamyl sulfide wherein the alkyl groups joined to the same nitrogen atom may be further joined together through carbon or oxygen, and vulcanizing the rubber.

5. An accelerator compound which is a dialkylcarbamyl dialkylthiocarbamyl sulfide wherein the alkyl groups joined to the same nitrogen atom may be further joined together through carbon or oxygen.

6. A rubber composition comprising rubber and a dialkyl carbamyl dialkylthiocarbamyl sulfide wherein the alkyl groups joined to the same nitrogen atom may be further joined together through carbon or oxygen.

7. A vulcanization accelerator which is a dialkylcarbamyl dialkylthiocarbamyl sulfide.

8. A rubber product resulting from the process set forth in claim 4.

9. A rubber product resulting from the process set forth in claim 1.

10. A process of producing vulcanized rubber products which comprises incorporating in rubber a vulcanizing agent and a compound corresponding to the formula

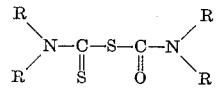

where R represents an alkyl group containing at least four carbon atoms in the chain, and vulcanizing the rubber.

11. A rubber product resulting from the process set forth in claim 10.

12. A rubber composition comprising rubber and a compound corresponding to the formula

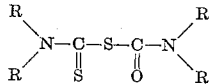

where R represents an alkyl group containing at least four carbon atoms in the chain.

13. A vulcanization accelerator corresponding to the formula

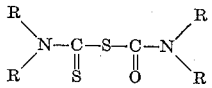

where R represents an alkyl group containing at least four carbon atoms in the chain.

14. A process of producing vulcanized rubber products which comprises incorporating in rubber a vulcanizing agent and di-n-amyl carbamyl di-n-amyldithiocarbamate, and vulcanizing the rubber.

15. A rubber product resulting from the process set forth in claim 14.

16. A rubber composition comprising rubber and di-n-amyl carbamyl di-n-amyldithiocarbamate.

PERCY J. LEAPER.